(12) United States Patent
Kabeya

(10) Patent No.: US 8,422,639 B2
(45) Date of Patent: Apr. 16, 2013

(54) COMMUNICATION APPARATUS

(75) Inventor: Shozo Kabeya, Gamagori (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 463 days.

(21) Appl. No.: 12/724,375

(22) Filed: Mar. 15, 2010

(65) Prior Publication Data

US 2010/0246779 A1 Sep. 30, 2010

(30) Foreign Application Priority Data

Mar. 31, 2009 (JP) ................................ 2009-086943

(51) Int. Cl.
*H04M 1/24* (2006.01)
(52) U.S. Cl.
USPC ........................... 379/29.03; 379/24; 379/401
(58) Field of Classification Search .................... 379/24, 379/387.01, 398–399.02, 401, 412–413.02, 379/29.03–29.04; 307/1
See application file for complete search history.

(56) References Cited

U.S. PATENT DOCUMENTS

2006/0192428 A1* 8/2006 Ito ..................................... 307/1

FOREIGN PATENT DOCUMENTS

| JP | 2006-191495 A | 7/2006 |
| JP | 2009-017111 A | 1/2009 |

OTHER PUBLICATIONS

Japan Patent Office, Notification of Reason for Refusal for Japanese Patent Application No. 2009-086943, dispatched Jan. 25, 2011.

* cited by examiner

*Primary Examiner* — Md S Elahee
(74) *Attorney, Agent, or Firm* — Baker Botts L.L.P.

(57) ABSTRACT

A communication apparatus including: a semiconductor DAA which performs line closing and opening processings; and a controller including; an adjustment controlling section which controls the semiconductor DAA such that a line voltage and a line current upon closing a line fall within a predetermined range; an adjustment-control starting section which starts the control; an adjustment-control stopping section which stops the control; and a change detecting section which detects a change of conditions of supply of the line voltage, wherein the adjustment-control starting section starts the control where the line closing processing has been performed and where the change has been detected, and wherein the adjustment-control stopping section stops the control when a predetermined length of time has passed, in at least one of where the line closing processing has been performed and the control is being performed, and where the change has been detected and the control is being performed.

14 Claims, 8 Drawing Sheets

COMMUNICATION APPARATUS

CROSS REFERENCE TO RELATED APPLICATION

The present application claims priority from Japanese Patent Application No. 2009-086943, which was filed on Mar. 31, 2009, the disclosure of which is herein incorporated by reference in its entirety.

BACKGROUND OF THE INVENTION

1. Field of the Invention

The present invention relates to a communication apparatus, and more particularly to a communication apparatus configured to control a connection to a line network using a semiconductor DAA.

2. Description of the Related Art

Recently, there is a communication apparatus configured to control opening and closing of a phone line using a semiconductor data access arrangement (hereinafter may be referred to as an "SDAA").

The line closing by the SDAA is performed by artificially making a terminal resistance by a voltage-and-current control of a transistor. In a conventional technique, a state of the line is measured by a line-state measuring portion integrated in the SDAA, and there are stored controlling conditions of line characteristics such as a voltage and a current judged by a value measured by the line-state measuring portion. This makes it possible to stabilize the line voltage and the line current supplied from an exchanger and to satisfactorily transmit and receive signals between the exchanger and the communication apparatus.

SUMMARY OF THE INVENTION

In the line closing by the conventional SDAA, a resistance value of the terminal resistance is fixed where the voltage-and-current control of the transistor is stabilized after the line closing.

However, the connecting exchanger is changed in the case where a user calls from a private branch exchanger to an outside line, in the case where a type of a telephone is changed from an IP phone to an analog phone in an ADSL modem, and so on. Thus, there is a risk in which a resistance value of the terminal resistance fixed for the initial exchanger becomes inappropriate.

This invention has been developed in view of the above-described situations, and it is an object of the present invention to provide a communication apparatus which can maintain the closing of the line in the most appropriate voltage and current characteristics even where electric supply conditions for the line are changed.

The object indicated above may be achieved according to the present invention which provides a communication apparatus comprising: a semiconductor DAA configured to include a line-voltage detecting portion which detects a line voltage and a voltage-and-current adjusting portion which adjusts the line voltage and a line current upon closing a line, and configured to perform a line closing processing and a line opening processing for changing a connection state of the line to a line network; and a controller including; an adjustment controlling section configured to control the voltage-and-current adjusting portion on the basis of the line voltage detected by the line-voltage detecting portion such that the line voltage and the line current upon closing the line fall within a predetermined range; an adjustment-control starting section configured to start the control of the voltage-and-current adjusting portion by the adjustment controlling section; an adjustment-control stopping section configured to stop the control of the voltage-and-current adjusting portion by the adjustment controlling section; and a change detecting section configured to detect a change of conditions of supply of the line voltage, wherein the adjustment-control starting section is configured to start the control of the voltage-and-current adjusting portion by the adjustment controlling section in the case where the line closing processing has been performed by the semiconductor DAA and in the case where the change of the conditions of the supply of the line voltage has been detected by the change detecting section, and wherein the adjustment-control stopping section is configured to stop the control of the voltage-and-current adjusting portion by the adjustment controlling section when a predetermined length of time has passed from the start of the control by the adjustment-control starting section, in at least one of the case where the line closing processing has been performed by the semiconductor DAA and the control of the voltage-and-current adjusting portion by the adjustment controlling section is being performed, and the case where the change of the conditions of the supply of the line voltage has been detected by the change detecting section and the control of the voltage-and-current adjusting portion by the adjustment controlling section is being performed.

The object indicated above may be achieved according to the present invention which also provides a communication apparatus comprising: a semiconductor DAA configured to include a line-voltage detecting portion which detects a line voltage and a voltage-and-current adjusting portion which adjusts the line voltage and a line current upon closing a line, and configured to perform a line closing processing and a line opening processing for changing a connection state of the line to a line network; and a controller including; an adjustment controlling section configured to control the voltage-and-current adjusting portion on the basis of the line voltage detected by the line-voltage detecting portion such that the line voltage and the line current upon closing the line fall within a predetermined range; an adjustment-control starting section configured to start the control of the voltage-and-current adjusting portion by the adjustment controlling section; an adjustment-control stopping section configured to stop the control of the voltage-and-current adjusting portion by the adjustment controlling section; and a change detecting section configured to detect a change of conditions of supply of the line voltage, wherein the adjustment-control starting section is configured to start the control of the voltage-and-current adjusting portion by the adjustment controlling section in the case where the line closing processing has been performed by the semiconductor DAA and in the case where the change of the conditions of the supply of the line voltage has been detected by the change detecting section, and wherein the adjustment-control stopping section is configured to stop the control of the voltage-and-current adjusting portion by the adjustment controlling section when the line voltage and the line current have fallen within the predetermined range continuously for a predetermined length of time, in at least one of the case where the line closing processing has been performed by the semiconductor DAA and the control of the voltage-and-current adjusting portion by the adjustment controlling section is being performed, and the case where the change of the conditions of the supply of the line voltage has been detected by the change detecting section and the control of the voltage-and-current adjusting portion by the adjustment controlling section is being performed.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which.

DESCRIPTION OF THE EMBODIMENT

Figure 1:
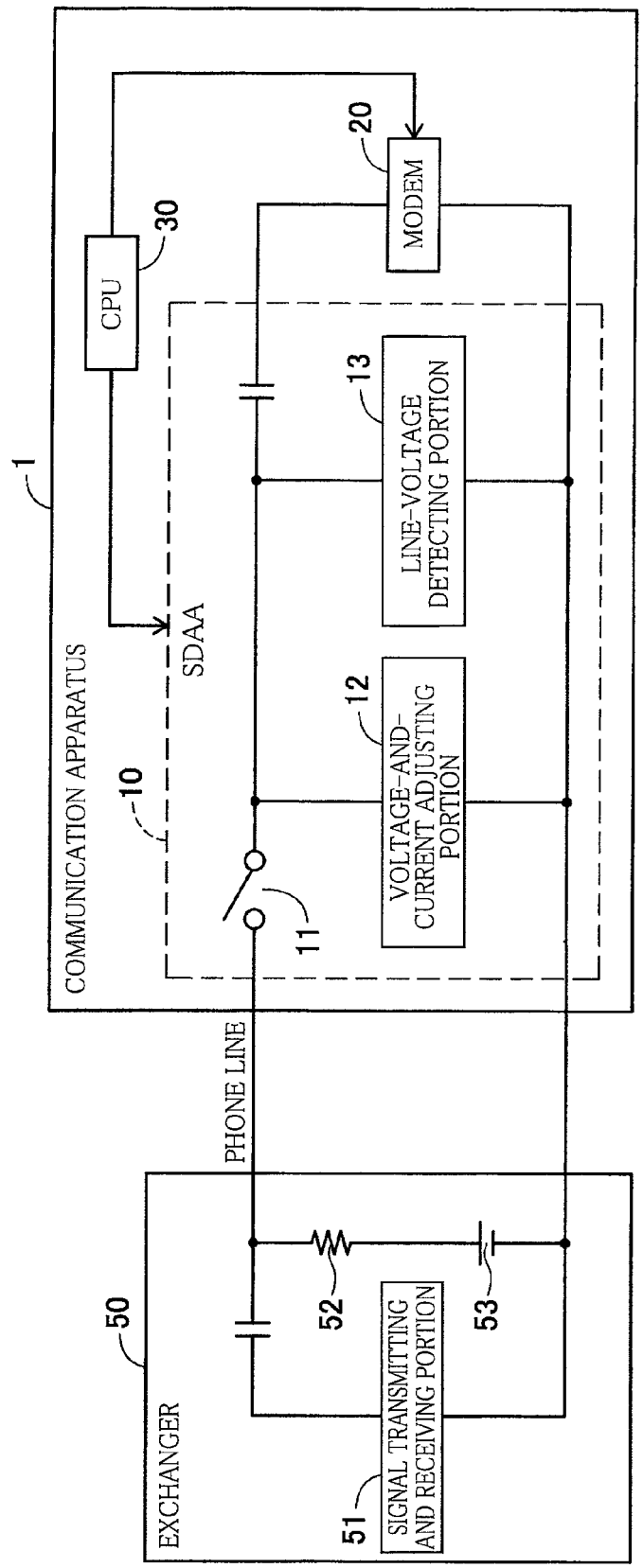
FIG. 1 is a schematic block diagram showing a configuration in which a line is closed between a communication apparatus and an exchanger.

Hereinafter, there will be described an embodiment of the present invention by reference to the drawings. A semiconductor DAA (hereinafter referred to as a "SDAA") 10 of a communication apparatus 1 as the present embodiment includes a hook switch 11, a voltage-and-current adjusting portion 12, and a line-voltage detecting portion 13. The hook switch 11 is a switch which is closed when the communication apparatus 1 becomes an off-hook state. The voltage-and-current adjusting portion 12 is a variable resistor which can adjust a line voltage and a line current while a line is closed, and is performed by the voltage and current control of a transistor. The voltage-and-current adjusting portion 12 performs the voltage-and-current control of the transistor in accordance with a command outputted from a CPU 30, thereby performing a line closing-and-opening processing, a DP (Dial Pulse) signal transmitting processing, and so on in addition to the adjustments of the line voltage and the line current while the line is closed. The line-voltage detecting portion 13 is a line which can detect the line voltage. Further, a modem 20 performs (a) a processing for detecting a dial tone and a ring back tone transmitted from an exchanger 50 in accordance with a received command outputted from the CPU 30, (b) a processing for transmitting a push button (PB) signal, and so on.

The exchanger 50 is connected to the communication apparatus 1 via the phone line. When the communication apparatus 1 becomes the off-hook state in which the phone line is closed, the line voltage is supplied from a fixed voltage supply 53 via a current limiting resistor 52, whereby the line current is flown. Further, a signal transmitting and receiving portion 51 transmits the dial tone and the ring back tone to the communication apparatus 1.

Figure 2:
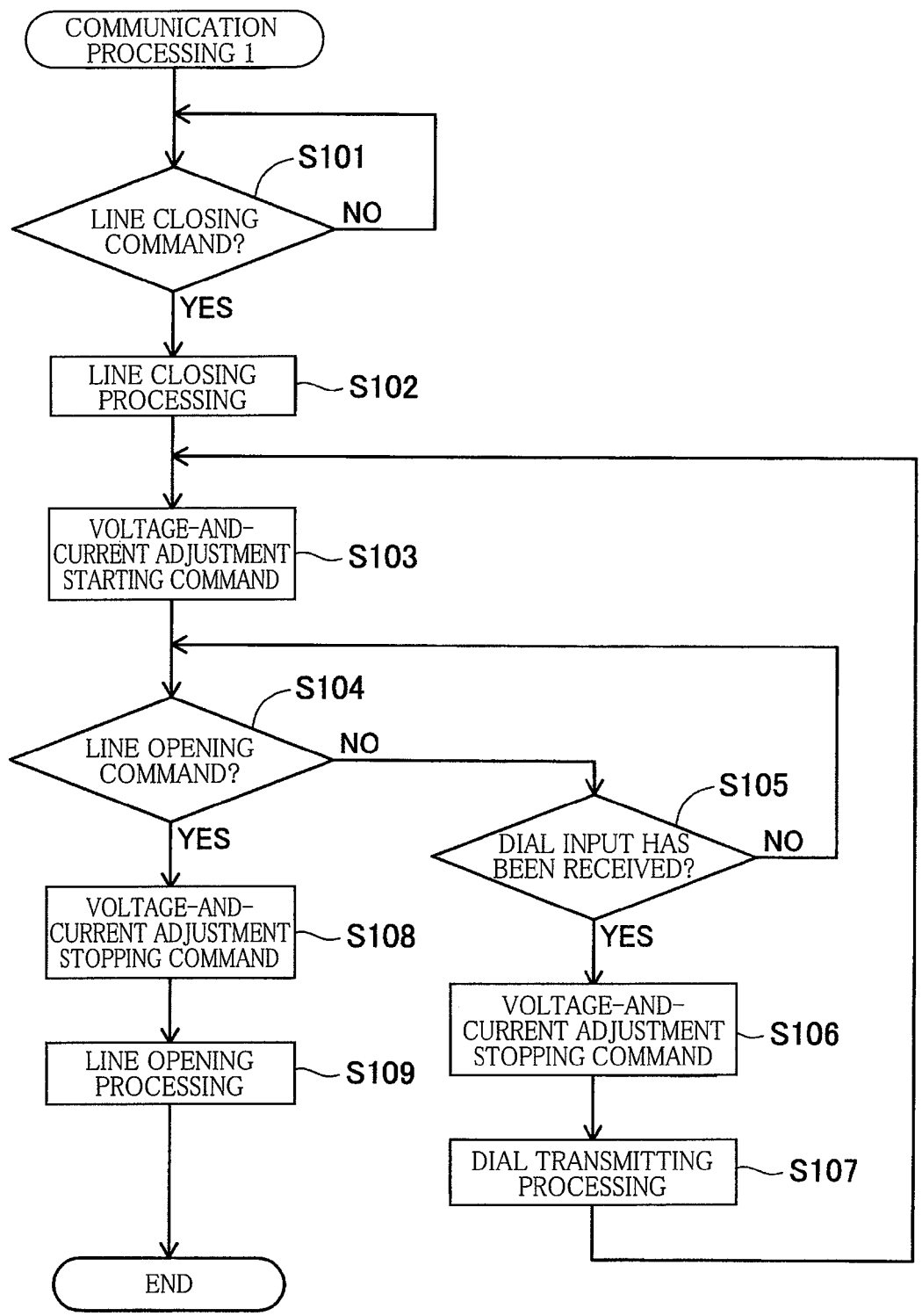
FIG. 2 is a flow-chart showing a communication processing 1 performed by a CPU.

There will be next explained an example of a communication processing (a communication processing 1) performed by the CPU 30 of the communication apparatus 1 with reference to FIG. 2. In S101, the CPU 30 waits until receiving a command for closing and connecting the line (hereinafter may be referred to as a "line closing command"). For example, when a user lifts a handset, that is, the communication apparatus 1 goes off-hook, the line closing command is produced. Where the CPU 30 has received the line closing command (S101: YES), the CPU 30 commands in S102 the voltage-and-current adjusting portion 12 to perform a processing for closing and connecting the line (hereinafter may be referred to as a "line closing processing"). Then, in S103, the CPU 30 starts the voltage-and-current adjusting processing by outputting a voltage-and-current adjustment starting command.

Here, there will be explained an example of the voltage-and-current adjusting processing (a voltage-and-current adjusting processing 1) with reference to FIG. 7. Where the CPU 30 has received the voltage-and-current adjustment starting command (S601: YES), the CPU 30 sets in S602 a three second timer which can measure a time of three seconds. In S603, the CPU 30 obtains a detection value of the line voltage from the line-voltage detecting portion 13. In S604, the CPU 30 calculates the line current on the basis of the detection value obtained in S603, and determines the line voltage and the line current.

In S605, the CPU 30 judges whether the line voltage and the line current determined in S604 are within a predetermined range of line standards or not. Where the CPU 30 has judged that the line voltage and the line current are not within the predetermined range (S605: NO), the CPU 30 controls in S606 the voltage-and-current adjusting portion 12 such that the line voltage and the line current fall within the predetermined range. On the other hand, where the CPU 30 has judged that the line voltage and the line current are within the predetermined range (S605: YES), the processing skips S606 and goes to S607.

In S607, the CPU 30 judges whether the measurement of three seconds by the three second timer is completed or not. Where the CPU 30 has judged that the measurement of three seconds by the three second timer is not completed (S607: NO), the CPU 30 judges in S608 whether the CPU 30 has received a command for stopping the voltage-and-current adjustment (hereinafter may be referred to as a "voltage-and-current adjustment stopping command") or not. Where the CPU 30 has judged that the CPU 30 has not received the voltage-and-current adjustment stopping command (S608: NO), the processing returns to S603 in which the CPU 30 continues to control the voltage-and-current adjusting portion 12 such that the line voltage and the line current fall within the predetermined range. On the other hand, where the CPU 30 has judged that the measurement of three seconds by the three second timer is completed (S607: YES), or where the CPU 30 has judged that the CPU 30 has received the voltage-and-current adjustment stopping command (S608: YES), the CPU 30 clears in S609 the three second timer, and the processing returns to S601 in which the CPU 30 waits again until receiving the voltage-and-current adjustment starting command. As thus described, in the voltage-and-current adjusting processing 1, the CPU 30 stops controlling the voltage-and-current adjusting portion 12 after three seconds have passed from the voltage-and-current adjustment starting command in addition to a case where the CPU 30 has received the voltage-and-current adjustment stopping command.

There will be explained the communication processing 1 with reference to FIG. 2 again. In S104, the CPU 30 judges whether the CPU 30 has received a command for opening the line (hereinafter may be referred to as a "line opening command") or not. For example, when the user has placed the handset on the communication apparatus 1, that is, the communication apparatus 1 goes on-hook, the line opening command is produced. Where the CPU 30 has judged that the CPU 30 has not received the line opening command (S104: NO), the CPU 30 judges in S105 whether the CPU 30 has received a dial input or not. Where the CPU 30 has judged that the CPU 30 has not received the dial input (S105: NO), the processing returns to S104. That is, the CPU 30 waits in S104 and S105 until receiving any of the line opening command and the dial input.

Where the CPU 30 has judged that the CPU 30 has received the dial input (S105: YES), the CPU 30 outputs in S106 the voltage-and-current adjustment stopping command to temporarily finish the voltage-and-current adjusting processing. Then, in S107, the CPU 30 performs a dial transmitting processing, and the processing returns to S103 in which the CPU 30 starts the voltage-and-current adjusting processing by outputting the voltage-and-current adjustment starting command. It is noted that the dial transmitting processing is the DP signal transmitting processing performed by the voltage-and-current adjusting portion 12 or the PB signal transmitting processing performed by the modem 20. Further, in the above-described processing of S106, and a processing of S408 in a communication processing 4 and a processing of S507 in a communication processing 5 which will be described below, the CPU 30 outputs the voltage-and-current adjustment stopping command to temporarily finish the voltage-and-current adjusting processing, but this command is a command which is for performing the voltage-and-current adjustment for three seconds in the voltage-and-current adjusting processing 1 shown in FIG. 7 as long as the CPU 30 has not outputted the voltage-and-current adjustment stopping command, for example. That is, in the case where the CPU 30 has not outputted the voltage-and-current adjustment stopping command in S106, there is a possibility that the count of the timer is continued in a state in which the three second timer set in S602 has not been cleared where the CPU 30 has outputted the voltage-and-current adjustment starting command in S103 after the processing of S107 during the voltage-and-current adjusting processing 1. In contrast, the voltage-and-current adjustment stopping command is outputted in S106 in the present embodiment, whereby the CPU 30 temporarily finishes the voltage-and-current adjusting processing started in S601 by clearing the three second timer in S609, and starts in S601 the voltage-and-current adjusting processing based on the dial input by the voltage-and-current adjustment starting command in S103 after the processing of S107.

Where the CPU 30 has judged that the CPU 30 has received the line opening command (S104: YES), the CPU 30 completes in S108 the voltage-and-current adjusting processing by outputting the voltage-and-current adjustment stopping command, then performs in S109 a processing for opening the line (hereinafter may be referred to as a "line opening processing") by outputting a command to the voltage-and-current adjusting portion 12, and then completes the communication processing 1. As thus described, in this communication processing 1, the CPU 30 starts the voltage-and-current adjusting processing by outputting the voltage-and-current adjustment starting command in the case where the CPU 30 has performed the line closing processing and in the case where the CPU 30 has performed the dial transmitting processing.

There will be next explained another example of the communication processing (a communication processing 2) performed by the CPU 30 of the communication apparatus 1. In S201, the CPU 30 waits until receiving the line closing command. Where the CPU 30 has received the line closing command (S201: YES), the CPU 30 performs in S202 the line closing processing by outputting a command to the voltage-and-current adjusting portion 12. Then, in S203, the CPU 30 clears a five second timer which can measure a time of five seconds. Then, in S204, the CPU 30 sets the modem 20 so as to detect the dial tone. Then, in S205, the CPU 30 starts the voltage-and-current adjusting processing by outputting the voltage-and-current adjustment starting command.

In S206, the CPU 30 judges whether the CPU 30 has received the line opening command or not. Where the CPU 30 has judged that the CPU 30 has not received the line opening command (S206: NO), the CPU 30 judges in S207 whether the CPU 30 has received the dial input or not. Where the CPU 30 has judged that the CPU 30 has received the dial input (S207: YES), the CPU 30 performs in S208 the dial transmitting processing, and then sets in S209 the five second timer. Then, the processing returns to S206.

Where the CPU 30 has judged that the CPU 30 has not received the dial input (S207: NO), the CPU 30 judges in S210 whether the measurement of five seconds by the five second timer is completed or not. Where the CPU 30 has judged that the measurement of five seconds is not completed (S210: NO), the CPU 30 judges in S211 whether the modem 20 has detected the dial tone or not. Where the CPU 30 has judged that the modem 20 has detected the dial tone (S211: YES), the CPU 30 starts in S212 the voltage-and-current adjusting processing by outputting the voltage-and-current adjustment starting command, and then clears in S213 the five second timer. Then, the processing returns to S206. On the other hand, where the CPU 30 has judged that the measurement of five seconds is completed (S210: YES) or where the CPU 30 has judged that the modem 20 has not detected the dial tone (S211: NO), the processing returns to S206.

Where the CPU 30 has judged that the CPU 30 has received the line opening command (S206: YES), the CPU 30 completes in S214 the voltage-and-current adjusting processing by outputting the voltage-and-current adjustment stopping command. Then, in S215 and S216, the CPU 30 respectively clears the detection setting of the dial tone and the five second timer. Then, in S217, the CPU 30 performs the line opening processing by outputting the command to the voltage-and-current adjusting portion 12 and completes the communication processing 2. As thus described, in the communication processing 2, the CPU 30 starts the voltage-and-current adjusting processing by outputting the voltage-and-current adjustment starting command in the case where the CPU 30 has performed the line closing processing and in the case where the modem 20 has detected the dial tone within five seconds after the dial transmitting processing.

Figure 4:
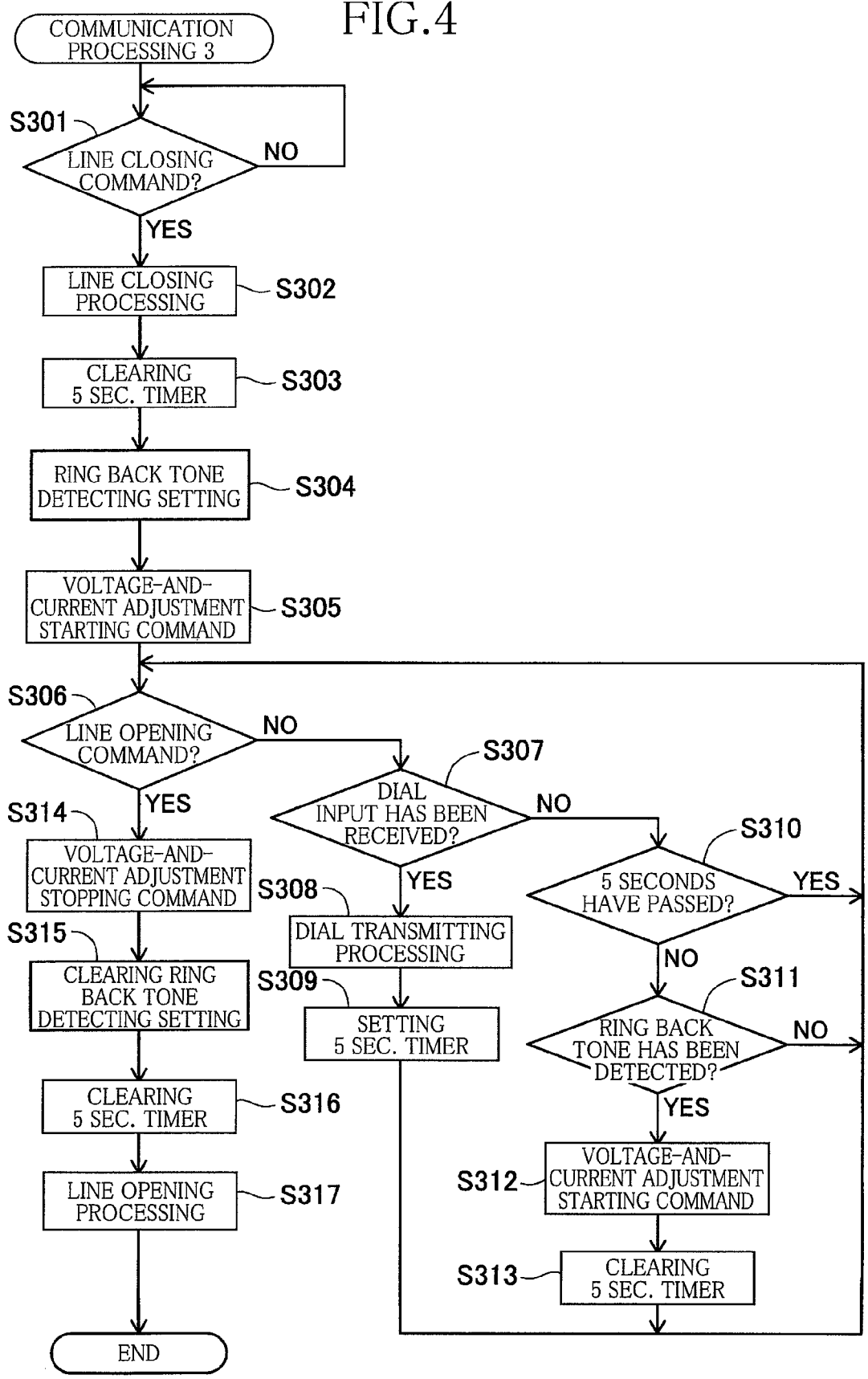
FIG. 4 is a flow-chart showing a communication processing 3 performed by the CPU.

It is noted that the communication apparatus 1 may be configured such that the modem 20 detects the ring back tone instead of the dial tone as shown in a communication processing 3 in FIG. 4. The communication processing 3 is the same as the communication processing 2 except for the ring back tone used instead of the dial tone. As shown in FIG. 4, in the communication processing 3, the CPU 30 starts the voltage-and-current adjusting processing by outputting the voltage-and-current adjustment starting command in the case where the CPU 30 has performed the line closing processing and in the case where the modem 20 has detected the ring back tone within five seconds after the dial transmitting processing.

There will be next explained another example of the communication processing (the communication processing 4) performed by the CPU 30 of the communication apparatus 1. In S401, the CPU 30 waits until receiving the line closing command. Where the CPU 30 has received the line closing command (S401: YES), the CPU 30 performs in S402 the line closing processing by outputting the command to the voltageand-current adjusting portion 12. Then, in S403, the CPU 30 starts the voltage-and-current adjusting processing by outputting the voltage-and-current adjustment starting command.

In S404, the CPU 30 judges whether the CPU 30 has received the line opening command or not. Where the CPU 30 has judged that the CPU 30 has not received the line opening command (S404: NO), the CPU 30 judges in S405 whether the CPU 30 has received the dial input or not. Where the CPU 30 has judged that the CPU 30 has not received the dial input (S405: NO), the processing returns to S404. That is, the CPU 30 waits in S404 and S405 until receiving any of the line opening command and the dial input.

Where the CPU 30 has judged that the CPU 30 has received the dial input (S405: YES), the CPU 30 judges in S406 whether the CPU 30 has received a pause signal or not. Where the CPU 30 has judged that the CPU 30 has not received the pause signal (S406: NO), the CPU 30 performs in S407 the dial transmitting processing, and the processing returns to S405. On the other hand, where the CPU 30 has judged that the CPU 30 has received the pause signal (S406: YES), the CPU 30 temporarily finishes in S408 the voltage-and-current adjusting processing by outputting the voltage-and-current adjustment stopping command. Then, in S409, the CPU 30 starts the voltage-and-current adjusting processing by outputting the voltage-and-current adjustment starting command. Then, in S410, the CPU 30 performs a pause processing for temporarily stopping transmitting the dial, and the processing returns to S405.

Where the CPU 30 has judged that the CPU 30 has received the line opening command (S404: YES), the CPU 30 completes in S411 the voltage-and-current adjusting processing by outputting the voltage-and-current adjustment stopping command. Then, in S412, the CPU 30 performs the line opening processing by outputting the command to the voltage-and-current adjusting portion 12 and completes the communication processing 4. As thus described, in the communication processing 4, the CPU 30 starts the voltage-and-current adjusting processing by outputting the voltage-and-current adjustment starting command in the case where the CPU 30 has performed the line closing processing and in the case where the CPU 30 has received the pause signal.

There will be next explained another example of the communication processing (the communication processing 5) performed by the CPU 30 of the communication apparatus 1. In S501, the CPU 30 waits until receiving the line closing command. Where the CPU 30 has received the line closing command (S501: YES), the CPU 30 controls in S502 the voltage-and-current adjusting portion 12 to perform the line closing processing. Then, in S503, the CPU 30 starts the voltage-and-current adjusting processing by outputting the voltage-and-current adjustment starting command.

In S504, the CPU 30 judges whether the CPU 30 has received the line opening command or not. Where the CPU 30 has not received the line opening command (S504: NO), the CPU 30 obtains in S505 the detection value of the line voltage from the line-voltage detecting portion 13, and then judges in S506 whether the obtained detection value of the line voltage is within the predetermined range or not. Specifically, for example, the CPU 30 obtains in S505 a maximum value and a minimum value of the line voltage in a predetermined length of time (e.g., within 0.5 seconds), then calculates in S506 a variation range of the line voltage from a difference of the maximum value and the minimum value of the line voltage, and then judges whether the calculated variation range is within a predetermined range (e.g., 1.5V) or not. Where the CPU 30 has judged that the line voltage is not within the predetermined range (S506: NO), the CPU 30 temporarily finishes in S507 the voltage-and-current adjusting processing by outputting the voltage-and-current adjustment stopping command, and the processing returns to S503 in which the CPU 30 starts the voltage-and-current adjusting processing by outputting the voltage-and-current adjustment starting command. On the other hand, where the CPU 30 has judged that the line voltage is within the predetermined range (S506: YES), the processing returns to S504.

Where the CPU 30 has received the line opening command (S504: YES), the CPU 30 completes in S508 the voltage-and-current adjusting processing by outputting the voltage-and-current adjustment stopping command, then performs in S509 the line opening processing by outputting the command to the voltage-and-current adjusting portion 12, and completes the communication processing 5. As thus described, in the communication processing 5, the CPU 30 starts the voltage-and-current adjusting processing by outputting the voltage-and-current adjustment starting command in the case where the CPU 30 has performed the line closing processing and in the case where the CPU 30 has judged that the line voltage is not within the predetermined range.

Figure 8:
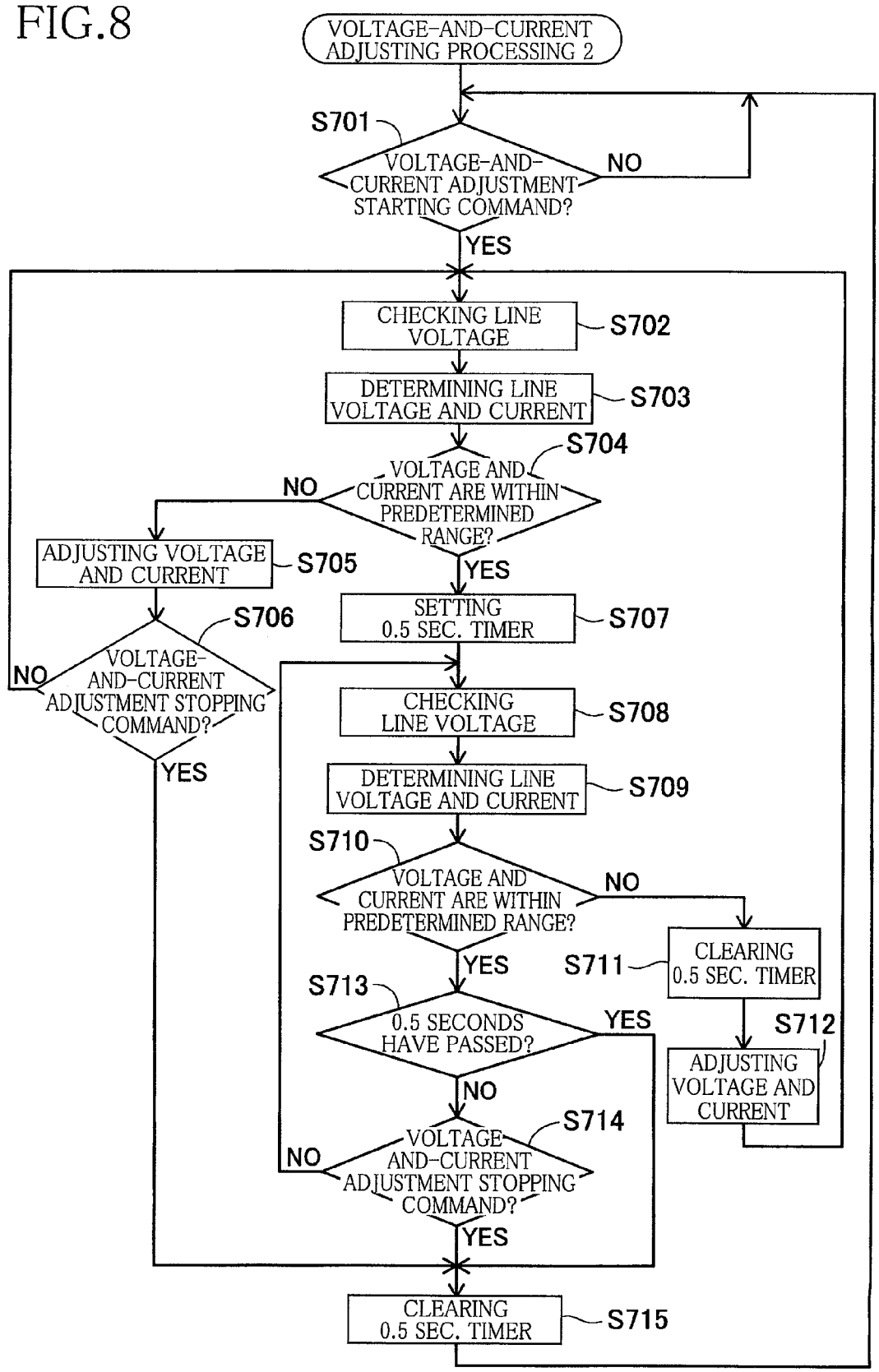
FIG. 8 is a flow-chart showing a voltage-and-current adjusting processing 2 performed by the CPU.

There will be next explained another example of the voltage-and-current adjusting processing (a voltage-and-current adjusting processing 2) with reference to FIG. 8. Where the CPU 30 has received the voltage-and-current adjustment starting command (S701: YES), the CPU 30 obtains in S702 the detection value of the line voltage from the line-voltage detecting portion 13. In S703, the CPU 30 calculates the line current on the basis of the detection value obtained in S702, and determines the line voltage and the line current.

In S704, the CPU 30 judges whether the line voltage and the line current determined in S703 are within the predetermined range of the line standards or not. Where the CPU 30 has judged that the line voltage and the line current are not within the predetermined range (S704: NO), the CPU 30 controls S705 the voltage-and-current adjusting portion 12 such that the line voltage and the line current fall within the predetermined range, and judges in S706 whether the CPU 30 has received the voltage-and-current adjustment stopping command or not. Where the CPU 30 has not received the voltage-and-current adjustment stopping command (S706: NO), the processing returns to S702.

Where the CPU 30 has judged in S704 that the line voltage and the line current are within the predetermined range (S704: YES), the CPU 30 sets in S707 the half a second timer which can measure a time of 0.5 seconds. In S708, the CPU 30 obtains the detection value of the line voltage from the line-voltage detecting portion 13. In S709, the CPU 30 calculates the line current on the basis of the detection value obtained in S708 and determines the line voltage and the line current.

In S710, the CPU 30 judges whether the line voltage and the line current determined in S709 are within the predetermined range of the line standards or not. Where the CPU 30 has judged that the line voltage and the line current are not within the predetermined range (S710: NO), the CPU 30 clears in S711 the half a second timer, then controls in S712 the voltage-and-current adjusting portion 12 such that the line voltage and the line current fall within the predetermined range, and the processing returns to S702.

Where the CPU 30 has judged that the line voltage and the line current are within the predetermined range (S710: YES), the CPU 30 judges in S713 whether the measurement of 0.5 seconds by the half a second timer is completed or not. Where the CPU 30 has judged that the measurement of 0.5 seconds by the half a second timer is not completed (S713: NO), the CPU 30 judges in S714 whether the CPU 30 has received the voltage-and-current adjustment stopping command or not.

Where the CPU 30 has not received the voltage-and-current adjustment stopping command (S714: NO), the processing returns to S708 in which the CPU 30 continues to check whether the line voltage and the line current are within the predetermined range or not.

On the other hand, where the CPU 30 has judged that the measurement of 0.5 seconds by the half a second timer is completed (S713: YES) or where the CPU 30 has judged that the CPU 30 has received the voltage-and-current adjustment stopping command (S706: YES, S714: YES), the CPU 30 clears in S715 the half a second timer, and the processing returns to S701 in which the CPU 30 waits again until receiving the voltage-and-current adjustment starting command. As thus described, in the voltage-and-current adjusting processing 2, the CPU 30 stops controlling the voltage-and-current adjusting portion 12 in the case where the line voltage and the line current have continuously been within the predetermined range for 0.5 seconds in addition to the case where the CPU 30 has judged that the CPU 30 has received the voltage-and-current adjustment stopping command.

In view of the above, the CPU 30 can be considered to include an adjustment controlling section configured to control the voltage-and-current adjusting portion 12 on the basis of the line voltage detected by the line-voltage detecting portion 13 such that the line voltage and the line current during closing of the line fall within the predetermined range, and this adjustment controlling section can be considered to perform the processings of S606 and S705. Further, the CPU 30 can be considered to include an adjustment-control starting section configured to start the control of the voltage-and-current adjusting portion 12 by the adjustment controlling section, and this adjustment-control starting section can be considered to perform the processing of S103, S205, S305, S403, and S503. Further, the CPU 30 can be considered to include an adjustment-control stopping section configured to stop the control of the voltage-and-current adjusting portion 12 by the adjustment controlling section, and this adjustment-control stopping section can be considered to perform the processing of S108, S214, S314, S411, and S508. Further, the CPU 30 can be considered to include a change detecting section configured to detect the change of the conditions of supply of the line voltage, and this change detecting section can be considered to perform the processings of S107, S211, S311, S406, and S506.

Figure 7:
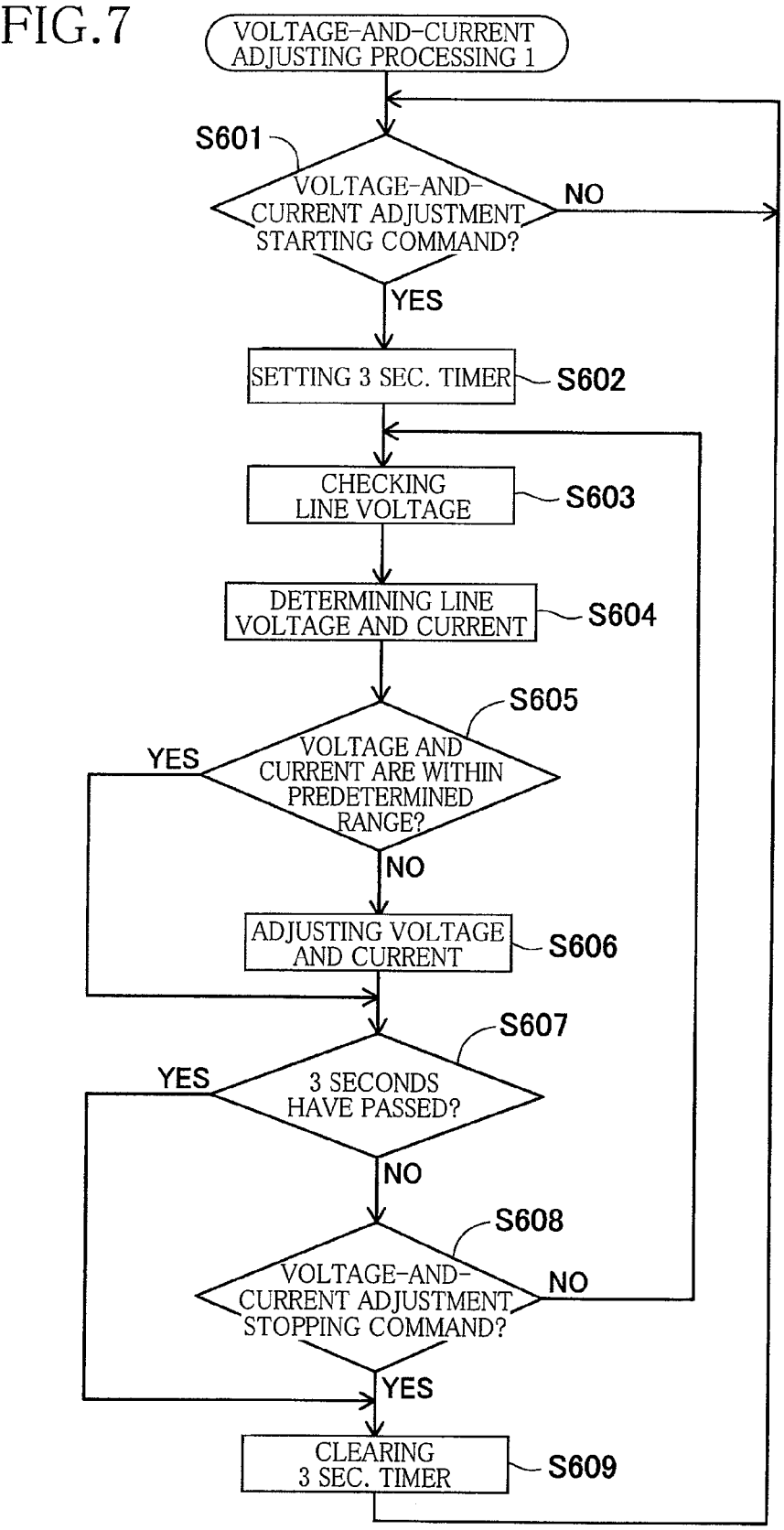
FIG. 7 is a flow-chart showing a voltage-and-current adjusting processing 1 performed by the CPU.

As described above, according to the embodiment of the present invention, the CPU 30 stops the control of the voltage-and-current adjusting portion 12 after three seconds have passed from the voltage-and-current adjustment starting command (in the voltage-and-current adjusting processing 1 shown in FIG. 7). Further, the CPU 30 stops the control of the voltage-and-current adjusting portion 12 where the line voltage and the line current have continuously been within the predetermined range for 0.5 seconds (in the voltage-and-current adjusting processing 2 shown in FIG. 8).

There has been known that an oscillation of the line voltage is caused in the adjustment of the line voltage and the line current which is performed by the voltage-and-current adjusting portion 12 of the SDAA 10. For example, where there is a difference or a deviation between the detection value of the line voltage by the line-voltage detecting portion 13 and an actual line voltage, excess or deficiency occur in the adjustment, whereby the line voltage repeatedly goes upward and downward. As a result, problems are caused in a telephone conversation, a facsimile reception, and so on, for example. In order to solve or eliminate these problems, in each of the voltage-and-current adjusting processings 1 and 2, the CPU 30 stops the control of the voltage-and-current adjusting portion 12 as described above. As a result, the oscillation of the line voltage can be prevented. Unless a connecting exchanger is changed, the line voltage and the line current supplied from the exchanger are not changed in a relatively large amount. Thus, once the line voltage and the line current are adjusted so as to match conditions of the supply of the line voltage, the problems do not occur even if the CPU 30 stops the control of the voltage-and-current adjusting portion 12.

Figure 3:
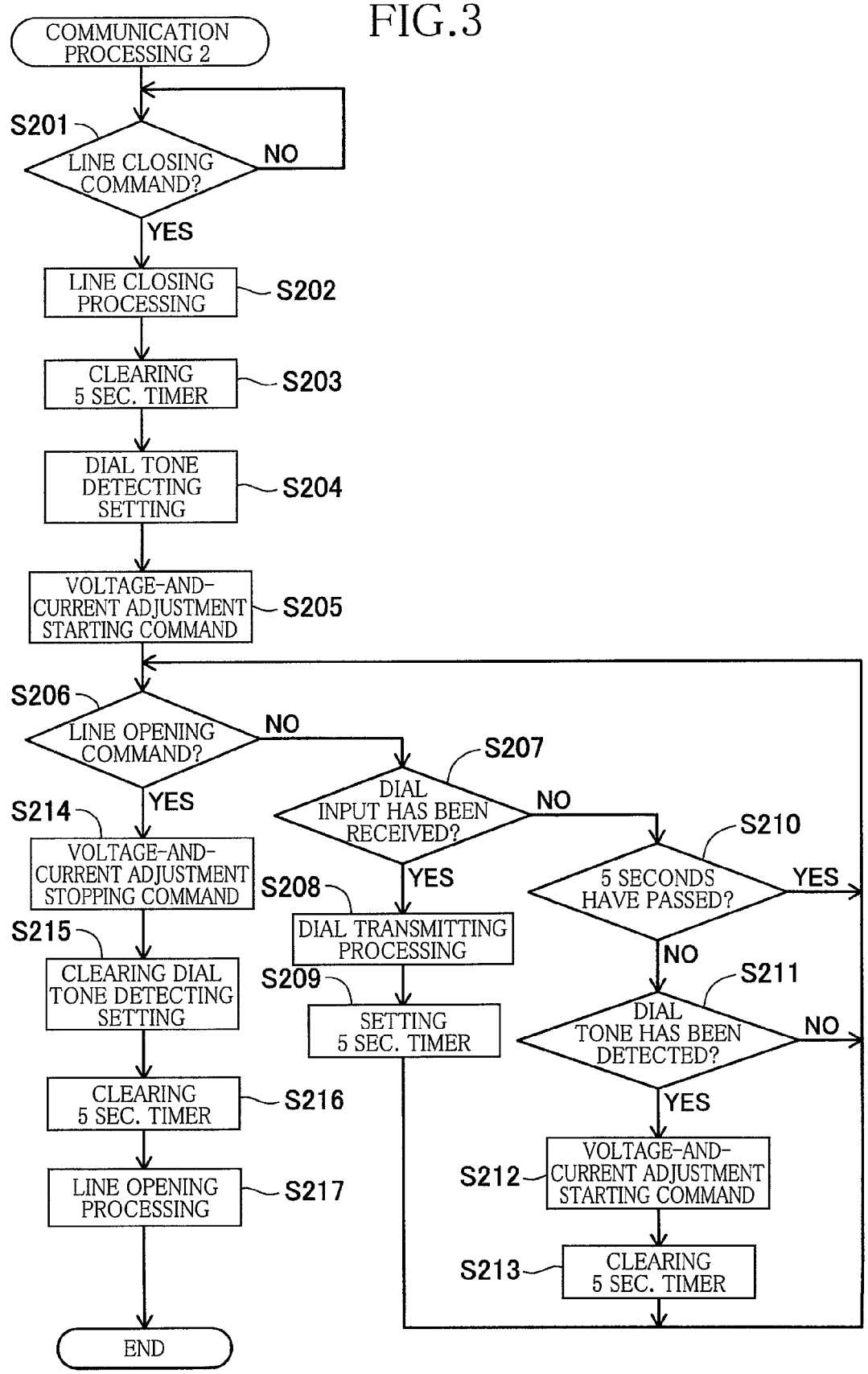
FIG. 3 is a flow-chart showing a communication processing 2 performed by the CPU.
Figure 5:
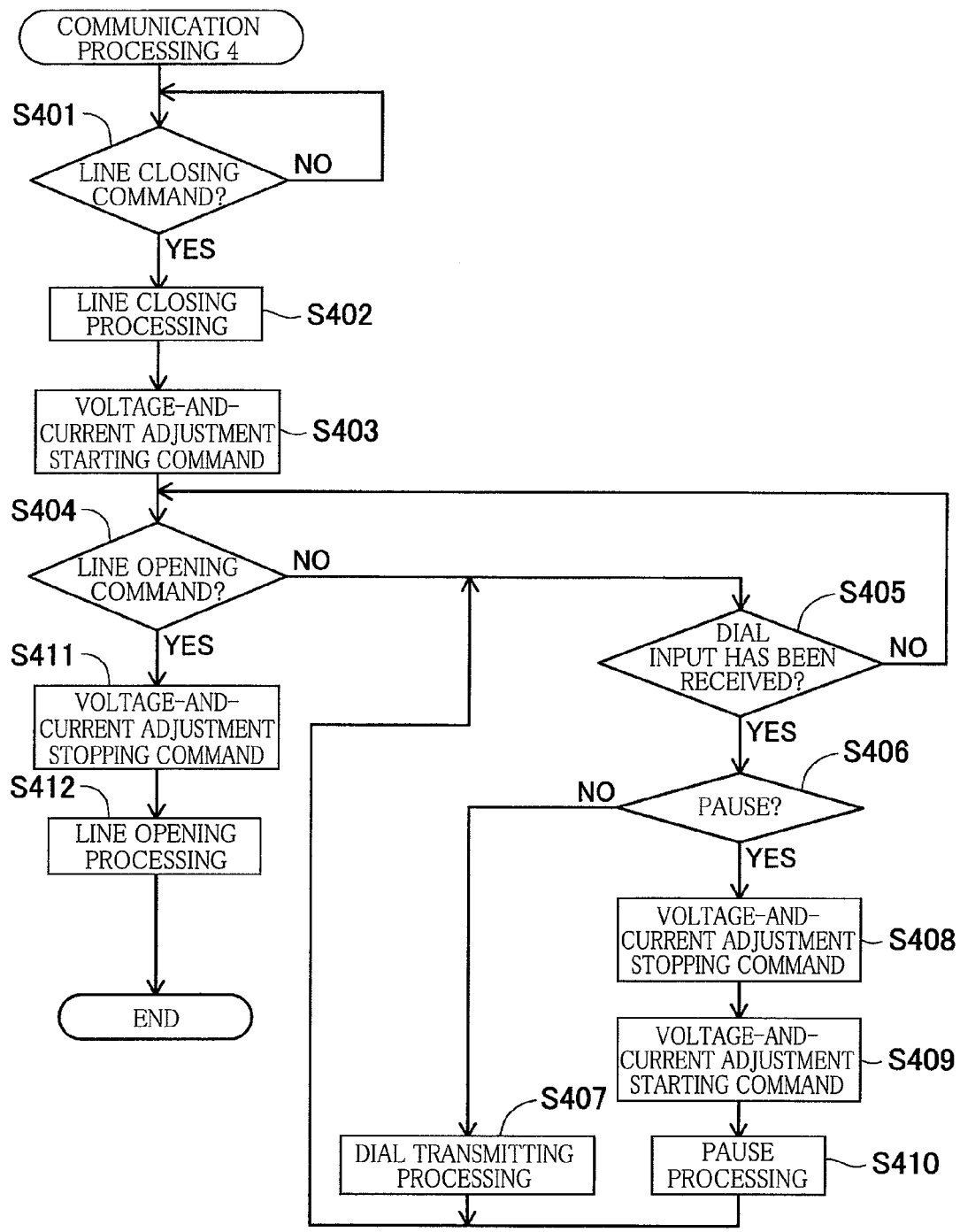
FIG. 5 is a flow-chart showing a communication processing 4 performed by the CPU.
Figure 6:
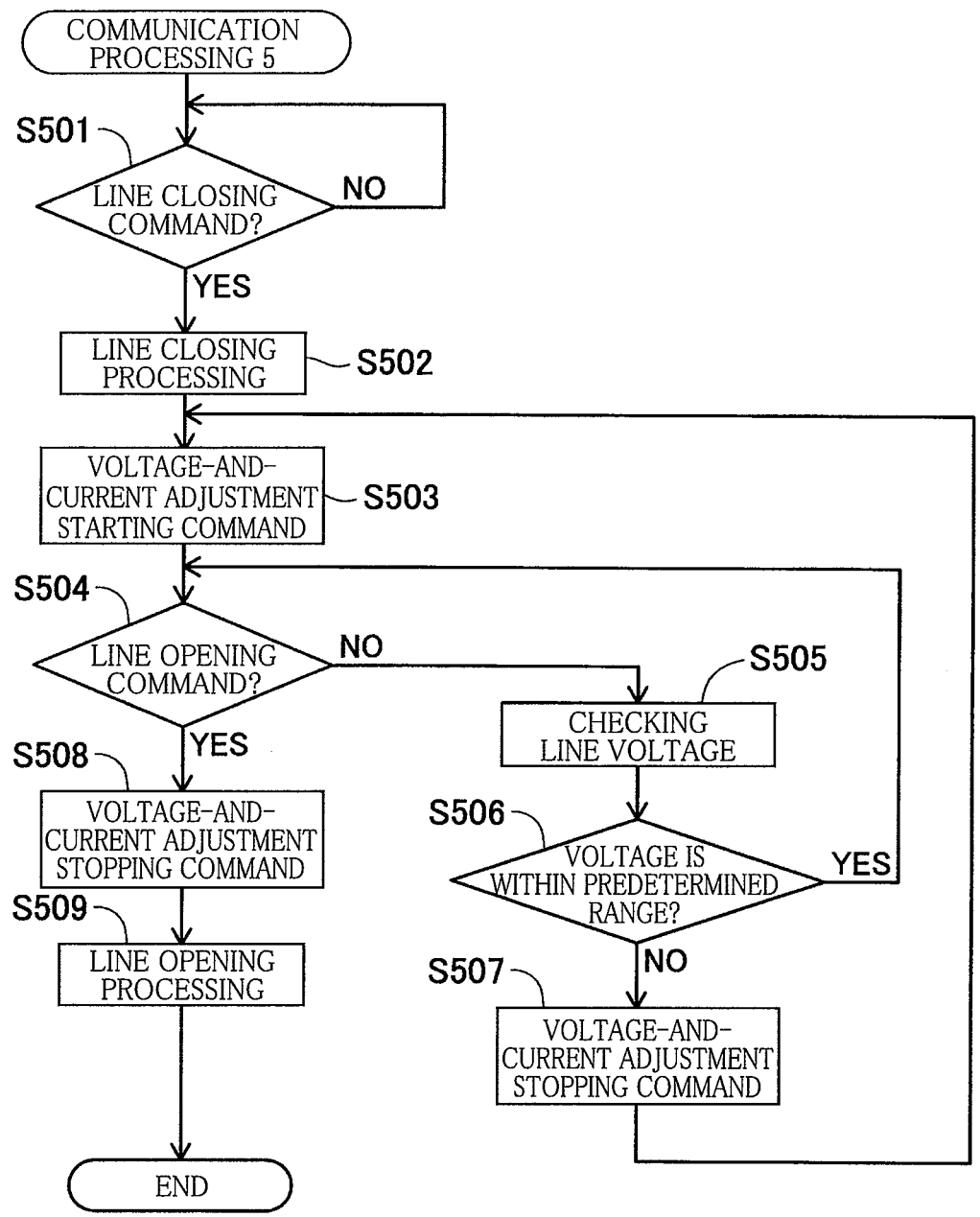
FIG. 6 is a flow-chart showing a communication processing 5 performed by the CPU.

Further, in addition to the case where the CPU 30 has performed the line closing processing, the CPU 30 starts the voltage-and-current adjusting processing by outputting the voltage-and-current adjustment starting command, in the case where the CPU 30 has performed the dial transmitting processing (in the communication processing 1 shown in FIG. 2), in the case where the modem 20 has detected the dial tone within five seconds after the dial transmitting processing (in the communication processing 2 shown in FIG. 3), in the case where the modem 20 has detected the ring back tone within five seconds after the dial transmitting processing (in the communication processing 3 shown in FIG. 4), in the case where the pause signal has been received (in the communication processing 4 in FIG. 5), or in the case where the line voltage is not within the predetermined range (in the communication processing 5 shown in FIG. 6).

The connecting exchanger is further changed in the case where the user calls from a private branch exchanger to an outside line, in the case where a type of a telephone is changed from an IP phone to an analog phone in an ADSL modem, and so on. Thus, the conditions of the supply of the line voltage are changed. However, as described above, in the communication processings 1-4, the CPU 30 starts the voltage-and-current adjusting processing by outputting the voltage-and-current adjustment starting command at a timing when the connecting exchanger is predicted to be changed. Further, as described above, in the communication processing 5, the CPU 30 starts the voltage-and-current adjusting processing by outputting the voltage-and-current adjustment starting command at a timing when the line voltage falls outside the predetermined range as a result of the change of the conditions of the supply of the line voltage. As a result, even where the conditions of the supply of the line voltage are changed, the line closing and connection can be maintained in an appropriate voltage and current characteristic. Further, it is possible to detect the change of the connecting exchanger more reliably by combining the communication processings 2-4. It is noted that, in the communication processings 1-4, the timing when the connecting exchanger is predicted to be changed is detected as a timing when the conditions of the supply of the line voltage are changed, and the change of the connecting exchanger is determined by the dial transmitting processing (S107) of the communication apparatus 1, the processings based on the dial transmitting processing (detections of the dial tone (S211) and the ring back tone (S311)). Thus, whether the conditions of the supply of the line voltage have been changed or not in the communication apparatus 1 can be determined by the dial transmitting processing of the communication apparatus 1 or a predetermined processing based on the dial transmitting processing.

Further, the conditions of the supply of the line voltage are changed also in the case where another telephone machine connected in parallel to the communication apparatus 1 becomes the off-hook state or the on-hook state during a conversation with the communication apparatus 1. However, like the communication processing 5, in the case where the CPU 30 starts the voltage-and-current adjusting processing by outputting the voltage-and-current adjustment starting command where the line voltage is not within the predetermined range, the line voltage and the line current can be adjusted so as to match new conditions of the supply of the line voltage.

It is to be understood that the invention is not limited to the details of the illustrated embodiment, but may be embodied with various changes and modifications, which may occur to those skilled in the art, without departing from the spirit and scope of the invention. For example, each processing in the above-described embodiment is merely an example, and another processing may be performed as long as the same result and effects as in each processing can be obtained.

Further, a time measured by the timer may be appropriately changed as desired. Furthermore, the voltage-and-current adjusting processings 1 and 2 may be combined.

It is noted that, in the above-described embodiment and modifications, the CPU 30 starts the control of the voltage-and-current adjusting portion 12 both in the case where the voltage-and-current adjusting processing is started in S103 on the basis of the line closing command outputted by the CPU 30 when the line closing processing is performed by the SDAA 10 and in the case where the voltage-and-current adjusting processing is started on the basis that the change of the conditions of the supply of the line voltage has been detected (i.e., the dial transmitting processing in S107, the detection of the dial tone in S211, the detection of the ring back tone in S311, the detection of the pause signal in S406, and the detection that the line voltage is outside the predetermined range in S506), while the CPU 30 stops the control of the voltage-and-current adjusting portion 12 when the predetermined conditions are satisfied (in S607 or S713), but the present invention is not limited to this configuration. For example, this communication apparatus 1 may be configured such that, in the case where the voltage-and-current adjusting processing is started on the basis of the line closing command outputted from the CPU 30 when the SDAA 10 performs the line closing, the CPU 30 stops the control of the voltage-and-current adjusting portion 12 where the predetermined conditions are satisfied, while in the case where the voltage-and-current adjusting processing is started on the basis that the change of the conditions of the supply of the line voltage has been detected, the CPU 30 does not stop the control of the voltage-and-current adjusting portion 12 even where the predetermined conditions are satisfied. Conversely, this communication apparatus 1 may be configured such that, in the case where the voltage-and-current adjusting processing is started on the basis that the change of the conditions of the supply of the line voltage has been detected, the CPU 30 stops the control of the voltage-and-current adjusting portion 12 where the predetermined conditions are satisfied, while in the case where the voltage-and-current adjusting processing is started on the basis of the line closing command outputted from the CPU 30 when the SDAA 10 performs the line closing, the CPU 30 does not stop the control of the voltage-and-current adjusting portion 12 even where the predetermined conditions are satisfied. It is noted that, in the above-described communication processing 2, where the modem 20 has detected the dial tone in S211 in FIG. 3 (S211: YES), the CPU 30 may output the voltage-and-current adjustment stopping command before outputting the voltage-and-current adjustment starting command in S212. Likewise, where the modem 20 has detected the ring back tone in S311 in FIG. 4 (S311: YES), the CPU 30 may output the voltage-and-current adjustment stopping command before outputting the voltage-and-current adjustment starting command in S312. By outputting these commands, the communication apparatus 1 can perform the same operation as that performed by the voltage-and-current adjustment stopping command in S106 in the communication processing 1. That is, it is possible to perform the voltage-and-current adjustment for a predetermined period (e.g., three seconds from the start of the control of the voltage and current adjustment or 0.5 seconds in which the line voltage is continuously within the predetermined range) as long as the CPU 30 has not outputted the voltage-and-current adjustment stopping command.

What is claimed is:

1. A communication apparatus comprising:
   a semiconductor DAA configured to include a line-voltage detecting portion which detects a line voltage and a voltage-and-current adjusting portion which adjusts the line voltage and a line current upon closing a line, and configured to perform a line closing processing and a line opening processing for changing a connection state of the line to a line network; and
   a controller including;
      an adjustment controlling section configured to control the voltage-and-current adjusting portion on the basis of the line voltage detected by the line-voltage detecting portion such that the line voltage and the line current upon closing the line fall within a predetermined range;
      an adjustment-control starting section configured to start the control of the voltage-and-current adjusting portion by the adjustment controlling section;
      an adjustment-control stopping section configured to stop the control of the voltage-and-current adjusting portion by the adjustment controlling section; and
      a change detecting section configured to detect a change of conditions of supply of the line voltage,
   wherein the adjustment-control starting section is configured to start the control of the voltage-and-current adjusting portion by the adjustment controlling section in the case where the line closing processing has been performed by the semiconductor DAA and in the case where the change of the conditions of the supply of the line voltage has been detected by the change detecting section,
   wherein the adjustment-control stopping section is configured to stop the control of the voltage-and-current adjusting portion by the adjustment controlling section when a predetermined length of time has passed from the start of the control by the adjustment-control starting section, in at least one of the case where the line closing processing has been performed by the semiconductor DAA and the control of the voltage-and-current adjusting portion by the adjustment controlling section is being performed, and the case where the change of the conditions of the supply of the line voltage has been detected by the change detecting section and the control of the voltage-and-current adjusting portion by the adjustment controlling section is being performed, and
   wherein the adjustment-control stopping section is further configured to stop the control of the voltage-and-current adjusting portion before a dial transmitting processing is started, and after the dial transmitting processing is finished, the adjustment-control starting section starts the control of the voltage-and-current adjusting portion by the adjustment controlling section.

2. The communication apparatus according to claim 1, wherein the change detecting section is configured to detect a change of an exchanger connected to the line, as the change of the conditions of the supply of the line voltage.

3. The communication apparatus according to claim 1,
wherein the change detecting section is configured to detect that the dial transmitting processing has been performed, as the change of the conditions of the supply of the line voltage.

4. The communication apparatus according to claim 1,
wherein the change detecting section is configured to detect a dial tone after the dial transmitting processing, as the change of the conditions of the supply of the line voltage.

5. The communication apparatus according to claim 1,
wherein the change detecting section is configured to detect a ring back tone after the dial transmitting processing, as the change of the conditions of the supply of the line voltage.

6. The communication apparatus according to claim 1,
wherein the change detecting section is configured to detect an input of a pause, as the change of the conditions of the supply of the line voltage.

7. The communication apparatus according to claim 1,
wherein the change detecting section is configured to detect that the line voltage has fallen outside the predetermined range, as the change of the conditions of the supply of the line voltage.

8. A communication apparatus comprising:
a semiconductor DAA configured to include a line-voltage detecting portion which detects a line voltage and a voltage-and-current adjusting portion which adjusts the line voltage and a line current upon closing a line, and configured to perform a line closing processing and a line opening processing for changing a connection state of the line to a line network; and
a controller including;
an adjustment controlling section configured to control the voltage-and-current adjusting portion on the basis of the line voltage detected by the line-voltage detecting portion such that the line voltage and the line current upon closing the line fall within a predetermined range;
an adjustment-control starting section configured to start the control of the voltage-and-current adjusting portion by the adjustment controlling section;
an adjustment-control stopping section configured to stop the control of the voltage-and-current adjusting portion by the adjustment controlling section; and
a change detecting section configured to detect a change of conditions of supply of the line voltage,
wherein the adjustment-control starting section is configured to start the control of the voltage-and-current adjusting portion by the adjustment controlling section in the case where the line closing processing has been performed by the semiconductor DAA and in the case where the change of the conditions of the supply of the line voltage has been detected by the change detecting section,
wherein the adjustment-control stopping section is configured to stop the control of the voltage-and-current adjusting portion by the adjustment controlling section when the line voltage and the line current have fallen within the predetermined range continuously for a predetermined length of time, in at least one of the case where the line closing processing has been performed by the semiconductor DAA and the control of the voltage-and-current adjusting portion by the adjustment controlling section is being performed, and the case where the change of the conditions of the supply of the line voltage has been detected by the change detecting section and the control of the voltage-and-current adjusting portion by the adjustment controlling section is being performed, and
wherein the adjustment-control stopping section is further configured to stop the control of the voltage-and-current adjusting portion before a dial transmitting processing is started, and after the dial transmitting processing is finished, the adjustment-control starting section starts the control of the voltage-and-current adjusting portion by the adjustment controlling section.

9. The communication apparatus according to claim 8,
wherein the change detecting section is configured to detect a change of an exchanger connected to the line, as the change of the conditions of the supply of the line voltage.

10. The communication apparatus according to claim 8,
wherein the change detecting section is configured to detect that the dial transmitting processing has been performed, as the change of the conditions of the supply of the line voltage.

11. The communication apparatus according to claim 8,
wherein the change detecting section is configured to detect a dial tone after the dial transmitting processing, as the change of the conditions of the supply of the line voltage.

12. The communication apparatus according to claim 8,
wherein the change detecting section is configured to detect a ring back tone after the dial transmitting processing, as the change of the conditions of the supply of the line voltage.

13. The communication apparatus according to claim 8,
wherein the change detecting section is configured to detect an input of a pause, as the change of the conditions of the supply of the line voltage.

14. The communication apparatus according to claim 8,
wherein the change detecting section is configured to detect that the line voltage has fallen outside the predetermined range, as the change of the conditions of the supply of the line voltage.

* * * * *